(12) United States Patent
Ito et al.

(10) Patent No.: US 10,821,960 B2
(45) Date of Patent: Nov. 3, 2020

(54) DEFLECTION CONTROL APPARATUS

(71) Applicant: TOYOTA JIDOSHA KABUSHIKI KAISHA, Toyota-shi, Aichi-ken (JP)

(72) Inventors: Hironori Ito, Gotemba (JP); Akira Nagae, Susono (JP); Ryo Inomata, Hiratsuka (JP); Masayuki Ikeda, Susono (JP)

(73) Assignee: TOYOTA JIDOSHKA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 15/936,551

(22) Filed: Mar. 27, 2018

(65) Prior Publication Data
US 2018/0312155 A1    Nov. 1, 2018

(30) Foreign Application Priority Data
Apr. 26, 2017 (JP) .................. 2017-087086

(51) Int. Cl.
*B60W 10/188* (2012.01)
*B60W 10/04* (2006.01)
(Continued)

(52) U.S. Cl.
CPC ........... *B60W 10/188* (2013.01); *B60R 21/01* (2013.01); *B60T 7/12* (2013.01); *B60T 7/22* (2013.01); *B60T 8/17* (2013.01); *B60T 8/17557* (2013.01); *B60T 8/366* (2013.01); *B60T 8/441* (2013.01); *B60T 13/148* (2013.01);
(Continued)

(58) Field of Classification Search
CPC .............. B60W 30/12; B60W 10/188; B60W 2520/14; B60W 2520/28; B60W 2540/20; B60W 2710/18; B60W 30/02; B60W 10/04; B60W 10/20; B60T 8/17557; B60T 2201/08; B60T 2250/03; B60T 8/1755; B60T 8/441; B60T 7/22; B60T 13/662; B60T 8/17; B60T 8/366; B60T 7/12; B60T 13/148; B60T 2201/083; B60R 21/01; B60R 2021/0273; B60R 2021/01013
See application file for complete search history.

(56) References Cited

U.S. PATENT DOCUMENTS

2006/0142922 A1* 6/2006 Ozaki ................. B60T 8/17557
                                                                       701/70
2007/0255474 A1* 11/2007 Hayakawa .......... B60T 8/17551
                                                                       701/70

FOREIGN PATENT DOCUMENTS

JP             4327817 B2    9/2009

* cited by examiner

*Primary Examiner* — Nga X Nguyen
(74) *Attorney, Agent, or Firm* — Sughrue Mion, PLLC

(57) ABSTRACT

A deflection control apparatus is provided with: a controller programmed to: a determine whether or not a vehicle is about depart from a driving lane, perform a deflection control of supplying a brake fluid pressure to at least one of brake mechanisms provided for corresponding wheels so that a yaw moment in a direction of avoiding departure of the vehicle is applied to the vehicle, if it is determined that the vehicle is about to depart, arithmetically operate a departure angle of the vehicle, and arithmetically operate a boost trajectory for boosting the brake fluid pressure to a target brake fluid pressure on condition that the departure angle is greater than a predetermined angle. The controller is programmed to perform the deflection control after boosting in advance the brake fluid pressure associated with the at least one of the plurality of brake mechanism, on the basis of the boost trajectory.

2 Claims, 7 Drawing Sheets

(51) Int. Cl.
*B60W 10/20* (2006.01)
*B60W 30/12* (2020.01)
*B60R 21/01* (2006.01)
*B60T 13/14* (2006.01)
*B60T 13/66* (2006.01)
*B60T 7/12* (2006.01)
*B60T 8/17* (2006.01)
*B60T 8/36* (2006.01)
*B60T 8/44* (2006.01)
*B60T 7/22* (2006.01)
*B60T 8/1755* (2006.01)
*B60R 21/02* (2006.01)

(52) U.S. Cl.
CPC ........... *B60T 13/662* (2013.01); *B60W 10/04* (2013.01); *B60W 10/20* (2013.01); *B60W 30/12* (2013.01); *B60R 2021/01013* (2013.01); *B60R 2021/0273* (2013.01); *B60T 2201/083* (2013.01)

DEFLECTION CONTROL APPARATUS

CROSS-REFERENCE TO RELATED APPLICATIONS

This application is based upon and claims the benefit of priority of the prior Japanese Patent Application No. 2017-087086, filed on Apr. 26, 2017, the entire contents of which are incorporated herein by reference.

BACKGROUND

1. Technical Field

Embodiments of the present disclosure relate to a deflection control apparatus configured to deflect a vehicle, and particularly relate to a deflection control apparatus configured to deflect a vehicle by using a braking force difference between left and right wheels.

2. Description of the Related Art

For this type of apparatus, for example, there is proposed an apparatus configured to generate a yaw moment in a direction of avoiding lane departure by using a braking force difference between left and right wheels when a subject vehicle or a host vehicle is about to depart from a driving lane (refer to Japanese Patent No. 4327817 (Patent Literature 1)). On the apparatus, a departure possibility level is determined, wherein the departure possibility level indicates whether the subject vehicle has a high possibility or a low possibility of the departure from the driving lane. At a low departure possibility level, a brake fluid pressure is boosted in advance, i.e., is pre-boosted, in a range in which a braking force is not generated. At a high departure possibility level, the braking force difference between the left and right wheels is generated to avoid the departure of the subject vehicle from the driving lane.

In a technique/technology described in the Patent Literature 1, for example, if a brake pedal is operated by a driver after it is determined that the subject vehicle has a low departure possibility level and the brake fluid pressure is pre-boosted, but before the subject vehicle has a high departure possibility level, then, the pre-boosted brake fluid pressure needs to be decreased. Here, in many cases, the brake fluid pressure is reduced through a pressure reducing valve, which is a duty control type solenoid valve having a relatively large operating noise.

In the technique/technology described in the Patent Literature 1, the brake fluid pressure is pre-boosted all the time if it is determined that the vehicle has a low departure possibility level. Thus, due to the operation of the brake pedal by the driver, the operating noise of the pressure reducing noise relatively likely occurs in association with the reduction of the pre-boosted brake fluid pressure.

SUMMARY

In view of the aforementioned problem, it is therefore an object of embodiments of the present disclosure to provide a deflection control apparatus configured to pre-boost the brake fluid pressure when the subject vehicle is about depart from the driving lane, and configured to suppress an occurrence frequency of the operating noise of the pressure reducing valve caused by the reduction of the pre-boosted brake fluid pressure.

The above object of embodiments of the present disclosure can be achieved by a deflection control apparatus mounted on a vehicle including a plurality of brake mechanisms, which are provided for corresponding wheels and which are configured to apply braking forces to the corresponding wheels by a brake fluid pressure being supplied to the plurality of brake mechanisms, the deflection control apparatus provided with: a controller programmed to: determine whether or not the vehicle is about depart from a driving lane on which the vehicle is currently running, to perform a deflection control of supplying the brake fluid pressure to at least one of the plurality of brake mechanisms so that a yaw moment in a direction of avoiding departure of the vehicle from the driving lane is applied to the vehicle, if it is determined that the vehicle is about to depart from the driving lane, arithmetically operate a departure angle, which is an angle made by a longitudinal direction of the vehicle and a direction in which the driving lane extends, and arithmetically operate a boost trajectory for boosting the brake fluid pressure to a target brake fluid pressure, which is less than or equal to a predetermined brake fluid pressure, which is less than the brake fluid pressure supplied to the at least one of the plurality of brake mechanisms in the deflection control, on condition that the arithmetically operated departure angle is greater than a predetermined angle; wherein the controller is programmed to perform the deflection control after boosting in advance the brake fluid pressure associated with the at least one of the plurality of brake mechanism, on the basis of the arithmetically operated boost trajectory, if the boost trajectory is arithmetically operated and if it is determined that the vehicle is about to depart from the driving lane.

The deflection control apparatus is configured in such a manner that the boost trajectory is arithmetically operated by the controller, on condition that the departure angle is greater than the predetermined angle, regardless of a determination result of whether or not the vehicle is about to depart from the driving lane. Considering that the vehicle runs along the driving lane, a frequency at which the departure angle is greater than the predetermined angle may be less than a frequency at which the departure angle is less than or equal to the predetermined angle. Therefore, an opportunity of the arithmetic operation of the boost trajectory may be relatively suppressed. Thus, an opportunity of the pre-boost of the brake fluid pressure based on the boost trajectory may be suppressed. As a result, it is possible to suppress the occurrence frequency of the operating noise of the pressure reducing valve caused by the reduction of the pre-boosted brake fluid pressure.

In addition, even if the boost trajectory is arithmetically operated, if it is not determined by the controller that the vehicle is about to depart from the driving lane, the brake fluid pressure may not be pre-boosted on the basis of the boost trajectory. In other words, on the deflection control apparatus, even if the boost trajectory is arithmetically operated, the brake fluid pressure may be pre-boosted only when the pre-boost is necessary, i.e., only if the boost trajectory is arithmetically operated and if it is determined that the vehicle is about to depart from the driving lane, and the brake fluid pressure is not pre-boosted in other cases. Therefore, on the deflection control apparatus, a frequency of the pre-boost of the brake fluid pressure may be suppressed if the boost trajectory is arithmetically operated, in comparison with such a configuration that the pre-boost is performed all the time. As a result, it is possible to suppress the occurrence frequency of the operating noise of the pressure reducing valve caused by the reduction of the pre-boosted brake fluid pressure.

In one aspect of the deflection control apparatus according to embodiments of the present disclosure, the controller is programmed to correct a criterion for determining whether or not the vehicle is about to depart from the driving lane so that it is determined that the vehicle is about to depart from the driving lane, more easily than when the boost trajectory is not arithmetically operated, if the boost trajectory is arithmetically operated.

If the criterion has a fixed value, a start timing of the deflection control when the brake fluid pressure is pre-boosted may be delayed in comparison with when the brake fluid pressure is not pre-boosted, i.e., when the boost trajectory is not arithmetically operated. This is because the deflection control is started after the pre-boost of the brake fluid pressure, as described above. If the criterion is corrected in the above manner, even when the brake fluid pressure is pre-boosted, the yaw moment in the direction of avoiding the departure can be applied to the vehicle, in the same timing as in cases where the brake fluid pressure is not pre-boosted.

Now, the correction of the criterion will be explained. Firstly, if the brake fluid pressure is not pre-boosted, there may be a relatively large delay of a response until an actual brake fluid pressure reaches a target brake fluid pressure associated with the deflection control, i.e., a brake fluid pressure for applying the yaw moment in the direction of avoiding the departure to the vehicle), after the start of the deflection control. Thus, the criterion may be set in view of a delay of the yaw moment in the direction of avoiding the departure to the vehicle caused by the response delay.

On the other hand, if the brake fluid pressure is pre-boosted, the response delay can be relatively reduced because the pre-boost is performed. Thus, if a timing of the application of the yaw moment in the direction of avoiding the departure to the vehicle when the brake fluid pressure is not pre-boosted is the same as a timing of the application of the yaw moment to the vehicle when the brake fluid pressure is pre-boosted, the start timing of the deflection control when the brake fluid pressure is pre-boosted may be delayed in comparison with a start timing of the deflection control when the brake fluid pressure is not pre-boosted. If the brake fluid pressure is pre-boosted, a time for pre-boosting the brake fluid pressure is required.

Therefore, the criterion may be corrected in view of a difference between the start timing of the deflection control when the brake fluid pressure is pre-boosted and the start timing of the deflection control when the pre-boost is not performed, and in view of the time required for the pre-boost. The difference is shorter than the time required for the pre-boost. As a result, the criterion may be corrected so that it is more easily determined that the vehicle is about to depart from the driving lane.

The nature, utility, and further features of this disclosure will be more clearly apparent from the following detailed description with reference to embodiments of the disclosure when read in conjunction with the accompanying drawings briefly described below.

DETAILED DESCRIPTION OF THE EMBODIMENTS

A deflection control apparatus according to embodiments of the present disclosure will be explained with reference to the drawings. In the embodiment below, a vehicle equipped with the deflection control apparatus according to embodiments of the present disclosure is used for explanation.

First Embodiment

A deflection control apparatus according to a first embodiment of the present disclosure will be explained with reference to FIG. 1 to FIG. 5.

(Configuration of Vehicle)

Figure 1:
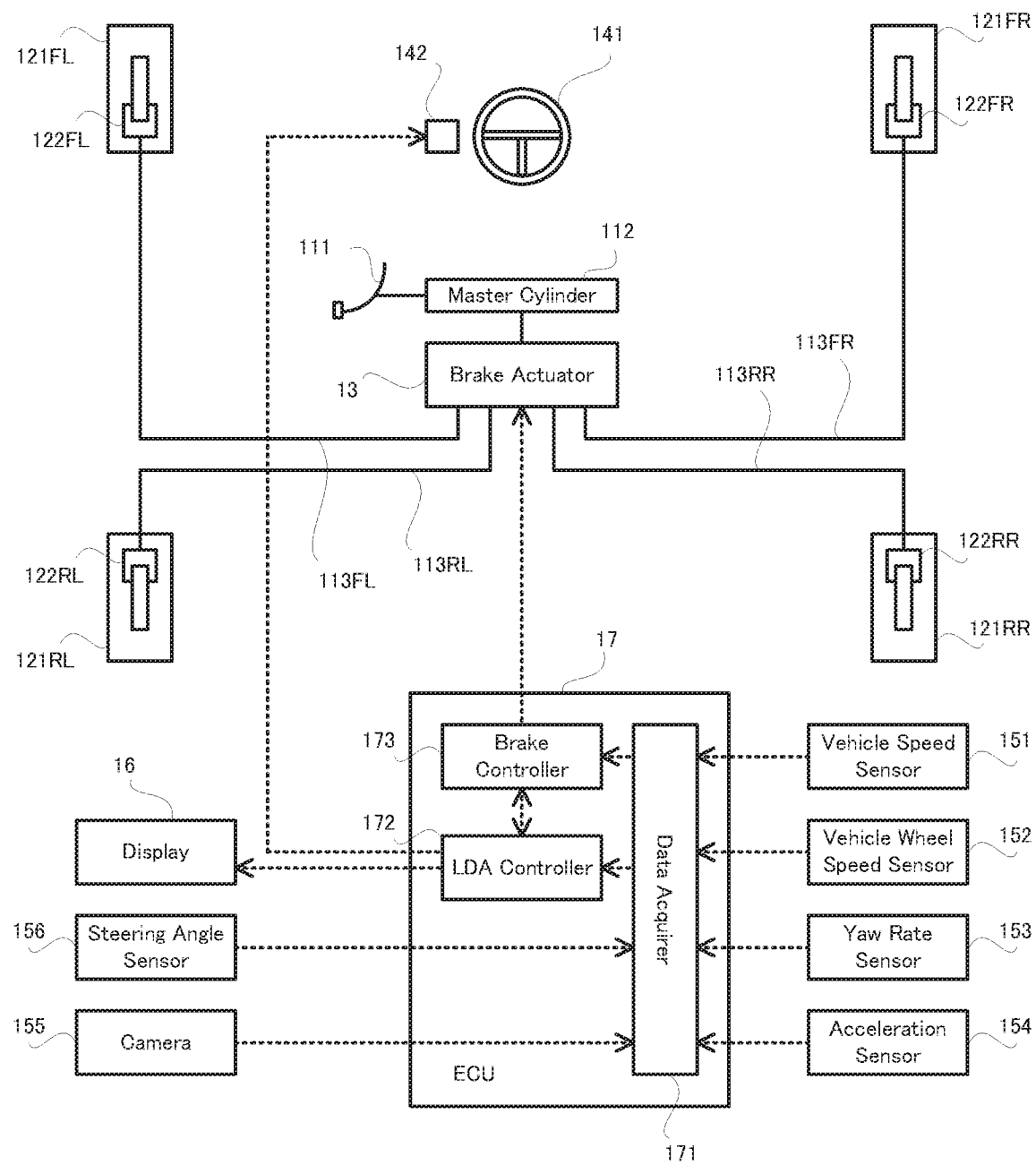
FIG. 1 is a block diagram illustrating a configuration of a vehicle according to a first embodiment.

A configuration of a vehicle 1 equipped with the deflection control apparatus according to the first embodiment will be explained with reference to FIG. 1. FIG. 1 is a block diagram illustrating the configuration of the vehicle 1 according to the first embodiment.

In FIG. 1, the vehicle 1 is provided with a brake pedal 111, a master cylinder 112, a brake actuator 13, a wheel cylinder 122FL provided on a front left wheel 121FL, a wheel cylinder 122RL provided on a rear left wheel 121RL, a wheel cylinder 122FR provided on a front right wheel 121FR, a wheel cylinder 122RR provided on a rear right wheel 121RR, and brake pipes 113FL, 113RL, 113FR, and 113RR.

The vehicle 1 is further provided with a steering wheel 141, a vibration actuator 142, a vehicle speed sensor 151, a vehicle wheel speed sensor 152, a yaw rate sensor 153, an acceleration sensor 154, a camera 155, a steering angle sensor 156, a display 16, and an electronic control unit (ECU) 17, which is a specific example of the "deflection control apparatus".

The master cylinder 112 is configured to adjust a pressure of brake fluid (or any fluid) in the master cylinder 112 in accordance with a step amount of the brake pedal 111. The pressure of the brake fluid in the master cylinder 112 is transmitted to the wheel cylinders 122FL, 122RL, 122FR, and 122RR respectively via the brake pipes 113FL, 113RL, 113FR, and 113RR. As a result, braking forces corresponding to pressures of the brake fluid transmitted to the wheel cylinders 122FL, 122RL, 122FR, and 122RR are respectively applied to the front left wheel 121FL, the rear left wheel 121RL, the front right wheel 121FR, and the rear right wheel 121RR. The "pressure of the brake fluid" will be hereinafter referred to as a "hydraulic pressure", as occasion demands.

The brake actuator 13 is configured to adjust the hydraulic pressure transmitted to each of the wheel cylinders 122FL, 122RL, 122FR, and 122RR, independently of the step amount of the brake pedal 111, under control of the ECU 17. Therefore, the brake actuator 13 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by a driver to steer the vehicle 1 (i.e., to turn wheels to be steered or turned). The vibration actuator 142 is configured to vibrate the steering wheel 141, under the control of the ECU 17.

The ECU 17 is programmed or configured to control the entire operation of the vehicle 1. Particularly in the first embodiment, the ECU 17 is configured to perform a lane departure preventing operation for preventing the vehicle 1 from departing from a driving lane on which the vehicle 1 is currently running. In other words, the ECU 17 is configured to function as a control apparatus for realizing so-called lane departure alert (LDA) or lane departure prevention (LDP).

In order to perform the lane departure preventing operation, the ECU 17 is provided with a data acquirer 171, a LDA controller 172, and a brake controller 173, as processing blocks logically realized, or processing circuits physically realized inside the ECU 17.

(Lane Departure Preventing Operation)

Next, the lane departure preventing operation according to the first embodiment will be explained with reference to a flowchart in FIG. 2.

Figure 2:
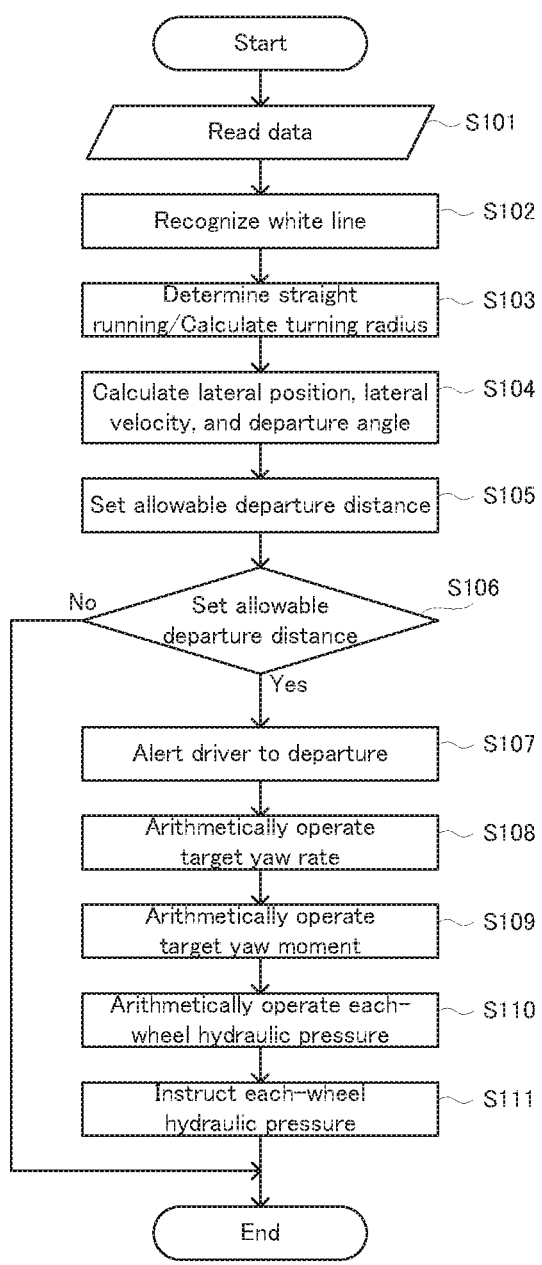
FIG. 2 is a flowchart illustrating a lane departure preventing operation according to the first embodiment.

In FIG. 2, firstly, the data acquirer 171 obtains detection data indicating detection results of the vehicle speed sensor 151, the vehicle wheel speed sensor 152, the yaw rate sensor 153, the acceleration sensor 154, and the steering angle sensor 156, and image data indicating images photographed by the camera 155 (step S101).

The LDA controller 172 analyzes the image data obtained in the step S101, thereby specifying a lane edge of the driving lane on which the vehicle 1 is currently running (or a "white line" disclosed in the first embodiment as an example of the lane edge) in the images taken by the camera 155 (step S102). A detailed explanation of a method of recognizing the white line will be omitted because the existing technique/technology can be applied to the method.

The LDA controller 172 determines whether or not the driving lane on which the vehicle 1 is currently running is a straight lane or a curve, on the basis of the white line specified in the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the step S102 (step S104). Here, the "lateral position" means a distance from the center of the driving lane to the vehicle 1 (or typically, a distance to the center of the vehicle 1) in a lane width direction, which is orthogonal to a direction in which the driving lane extends (or a lane extension direction). The "lateral velocity" means a velocity or a speed of the vehicle 1 in the lane width direction. The "departure angle" means an angle made by the driving lane and a longitudinal direction axis of the vehicle 1, i.e., an angle made by the white line and the longitudinal direction axis of the vehicle 1.

The LDA controller 172 further sets an allowable departure distance (step S105). The allowable departure distance indicates an allowable maximum value of a departure distance of the vehicle 1 from the driving lane, i.e., a departure distance of the vehicle 1 from the white line, when the vehicle 1 departs from the driving lane.

For example, the allowable departure distance may be set in the following manner; namely, the LDA controller 172 may set the allowable departure distance from the viewpoint of satisfying requirements of law and regulations (e.g., requirements of new car assessment programme (NCAP)). A method of setting the allowable departure distance is not limited to this example.

Then, the LDA controller 172 determines whether or not there is a possibility that the vehicle 1 departs from the driving lane on which the vehicle 1 is currently running (step S106). Specifically, for example, the LDA controller 172 may calculate a future position (e.g., in several hundred milliseconds to several seconds) of the vehicle 1, on the basis of a current velocity, the current lateral position, the current lateral velocity, or the like of the vehicle 1. The LDA controller 172 may then calculate a departure amount of the vehicle 1 by comparing the future position of the vehicle 1 with the center of the driving lane. An example of the departure amount includes a deviation amount of the future position of the vehicle 1 in the lane width direction from the center of the driving lane. Then, the LDA controller 172 may determine whether or not the departure amount of the vehicle 1 is greater than a departure determination value (which is expressed as a distance from the center of the driving lane in the lane width direction, so as to be compared with the departure amount). If it is determined that the departure amount of the vehicle 1 is greater than the departure determination value (e.g., the vehicle 1 goes across or is on the white line in the future position), the LDA controller 172 may determine that there is the possibility that the vehicle 1 departs from the driving lane.

In the determination in the step S106, if it is determined that there is no possibility that the vehicle 1 departs from the driving lane (the step S106: No), the lane departure preventing operation illustrated in FIG. 2 is ended. Then, the LDA controller 172 may restart the lane departure preventing operation illustrated in FIG. 2 after a lapse of a first predetermined period (e.g., several milliseconds to several ten milliseconds). In other words, the lane departure preventing operation illustrated in FIG. 2 may be repeated with a period corresponding to the first predetermined period.

On the other hand, in the determination in the step S106, if it is determined that there is the possibility that the vehicle 1 departs from the driving lane, i.e., if the vehicle 1 is about to depart from the driving lane (the step S106: Yes), the LDA controller 172 alerts the driver of the vehicle 1 to the possibility of the departure of the vehicle 1 from the driving lane (step S107). Specifically, the LDA controller 172 may control the display 16, for example, to display an image indicating the possibility of the departure of the vehicle 1 from the driving lane, and/or may control the vibration actuator 142 to inform the driver of the possibility of the departure of the vehicle 1 from the driving lane by using the vibration of the steering wheel 141.

In parallel with the step S107, the LDS controller 172 performs a departure avoidance control (steps S108 to S111). At this time, the LDA controller 172 may turn on a flag associated with the departure avoidance control. Here, the departure avoidance control is a control in which a yaw moment in a direction of avoiding the departure is applied to the vehicle 1 so that the departure distance of the vehicle 1 from the driving lane is within the allowable departure distance. The "departure avoidance control" according to the first embodiment is an example of the "deflection control" according to embodiments of the present disclosure.

In the departure avoidance control according to the first embodiment, the braking force may be applied at least one of the front left wheel 121FL, the rear left wheel 121RL, the front right wheel 121FR, and the rear right wheel 121RR to generate a braking force difference between the left and right wheels. As a result, the yaw moment in the direction of avoiding the departure may be applied to the vehicle 1. Hereinafter, the departure avoidance control will be specifically explained.

The LDA controller 172 arithmetically operates a target yaw rate so that the vehicle 1, which is leaving from the center of the driving lane, runs along a target track that is directed to the center of the driving lane, i.e., a traveling line to be targeted (step S108).

The LDA controller 172 then calculates a yaw moment to be applied to the vehicle 1 as a target yaw moment, in order to generate the target yaw rate in the vehicle 1 (step S109). For example, the LDA controller 172 may calculate the target yaw moment by converting the target yaw rate to the target yaw moment on the basis of a predetermined transfer function.

The LDA controller 172 then calculates a braking force that allows the target yaw moment to be achieved. At this time, the LDA controller 172 may individually calculate the braking forces to be respectively applied to the front left wheel 121FL, the rear left wheel 121RL, the front right wheel 121FR, and the rear right wheel 121RR. The LDA controller 172 may transmit a signal indicating the calculated braking force to the brake controller 173.

The brake controller 173 calculates a pressure command value for designating the hydraulic pressure required to generate the braking force, on condition that the signal indicating the braking force is received from the LDA controller 172 (step S110). At this time, the brake controller 173 may individually calculate the pressure command values for designating the hydraulic pressures inside the wheel cylinders 122FL, 122RL, 122FR, and 122RR.

The brake controller 173 then controls the brake actuator 13 on the basis of the pressure command value (step S111). As a result, the braking force corresponding to the pressure command value is applied to at least one of the front left wheel 121FL, the rear left wheel 121RL, the front right wheel 121FR, and the rear right wheel 121RR. In other words, the yaw moment in the direction of avoiding the departure is applied to the vehicle 1 due to the braking force difference between the left and right wheels.

The LDA controller 172 may then restart the lane departure preventing operation illustrated in FIG. 2 after a lapse of the first predetermined period. At this time, the flag associated with the departure avoidance control is on, and thus, the lane departure preventing operation is started while the yaw moment caused by the departure avoidance control is applied to the vehicle 1. In the determination in the step S106 performed again, if it is determined that there is the possibility that the vehicle 1 departs from the driving lane (the step S106: Yes), the process after the step S107 is performed. Thus, the application of the yaw moment caused by the departure avoidance control to the vehicle 1 is continued. On the other hand, in the determination in the step S106 performed again, if it is determined that there is no possibility that the vehicle 1 departs from the driving lane (the step S106: No), the control flag associated with the departure avoidance control is turned off, and the application of the yaw moment caused by the departure avoidance control to the vehicle 1 is ended.

(Pre-Boost Setting Operation)

Next, a pre-boost setting operation performed in parallel with the aforementioned lane departure preventing operation will be explained with reference to a flowchart in FIG. 3. The pre-boost setting operation is an operation for determining whether or not the hydraulic pressure is pre-boosted in the aforementioned lane departure preventing operation.

Figure 3:
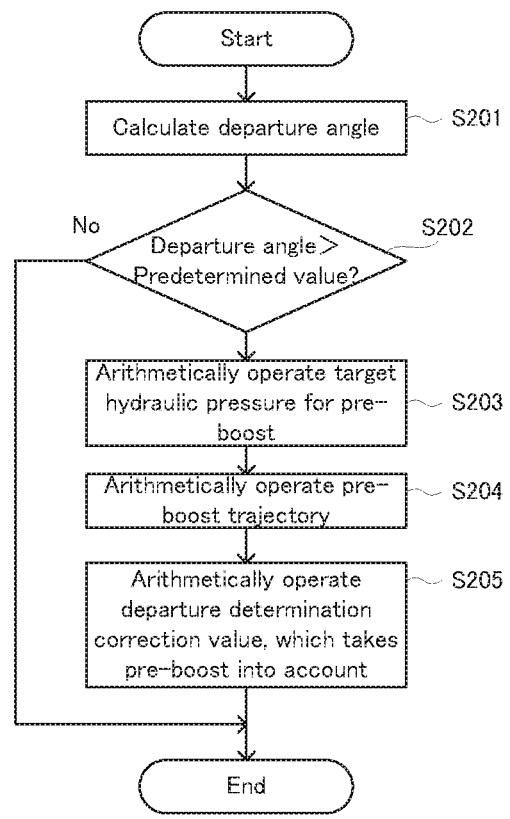
FIG. 3 is a flowchart illustrating a pre-boost setting operation according to the first embodiment.

In FIG. 3, the LDA controller 172 firstly calculates the departure angle of the vehicle 1 (step S201). Here, the LDA controller 172 may obtain the departure angle calculated in the step S104, instead of calculating the departure angle.

Figure 4A:
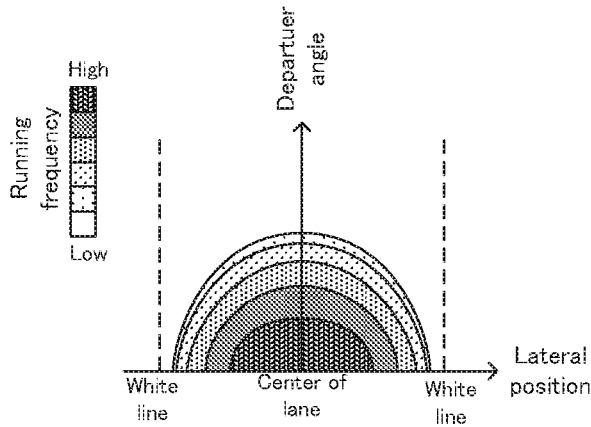
FIG. 4A is a diagram illustrating an example of a relation among a position of a vehicle on a driving lane, a departure angle of the vehicle, and a running frequency of the vehicle.
Figure 4B:
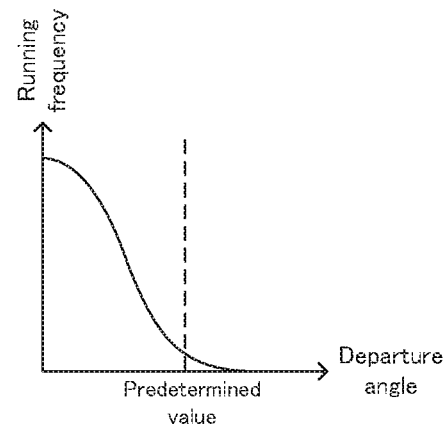
FIG. 4B is a diagram illustrating an example of a relation between the departure angle and the running frequency on a departure angle-running frequency plane in FIG. 4A.
Figure 5:
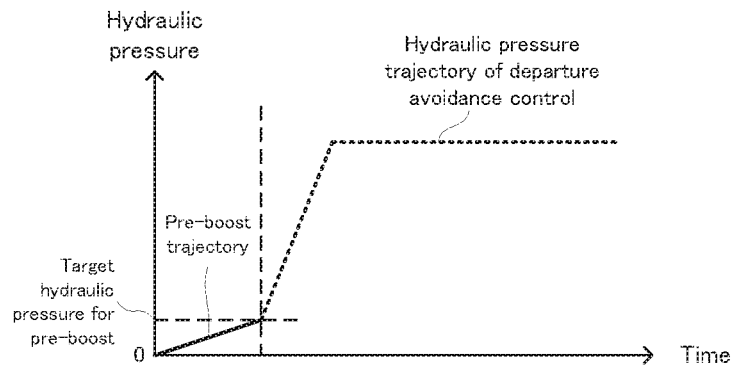
FIG. 5 is a diagram illustrating an example of a hydraulic pressure trajectory according to the first embodiment.

The LDA controller 172 then determines whether or not the departure angle is greater than a predetermined value, which is a specific example of the "predetermined angle" (step S202). Here, the "predetermined value" will be explained with reference to FIG. 4A and FIG. 4B. FIG. 4A is a diagram illustrating an example of a relation among a lateral position, the departure angle, and a running frequency of the vehicle 1 that is running on the driving lane. FIG. 4B is a diagram illustrating an example of a relation between the departure angle and the running frequency on a departure angle-running frequency plane in FIG. 4A.

As illustrated in FIG. 4A, the vehicle 1 often runs in the vicinity of the center of the driving lane, and rarely runs in an edge portion of the driving lane, i.e., in the vicinity of the white line. The departure angle of the vehicle that runs on the driving lane is relatively small in many cases, and it is rare that the departure angle is relatively large.

By the way, if the speed of the vehicle 1 is relatively high even when the departure angle is relatively small, it is determined in some cases that there is the possibility that the vehicle 1 departs from the driving lane in the step S106. On the other hand, if the departure angle is relatively small, the target yaw moment for preventing the departure of the vehicle 1 from the driving lane is relatively small. That is because the departure of the vehicle 1 from the driving lane can be prevented if the vehicle 1 is slightly deflected to a center side of the driving lane. In other words, if the departure angle is relatively small, the hydraulic pressure for realizing the target yaw moment is relatively small. Therefore, if the departure angle is relatively small, it is possible to boost it to the hydraulic pressure for realizing the target yaw moment at a relatively early stage, without pre-boosting the hydraulic pressure.

On the other hand, if the departure angle is relatively large, the target yaw moment for preventing the departure of the vehicle 1 from the driving lane is relatively large. In this case, it is possible to boost it to the hydraulic pressure for realizing the target yaw moment at a relatively early stage, by pre-boosting the hydraulic pressure.

Based on these points, the aforementioned "predetermined value" may be set as a lower limit value of a range of the departure angle in which it is considered to be desirable to pre-boost the hydraulic pressure if it is determined that there is the possibility that the vehicle 1 departs from the driving lane. By setting the "predetermined value" in this manner, it is possible to significantly reduce an opportunity of the pre-boost, by not pre-boosting the hydraulic pressure if the departure angle is relatively small, because there are many opportunities at which the vehicle 1 runs in a state in which the departure angle is relatively small, as illustrated in FIG. 4B. In other words, the hydraulic pressure is pre-boosted only when needed.

Back in FIG. 3, in the determination in the step S202 if it is determined that the departure angle is less than or equal to the predetermined value (the step S202: No), the pre-boost setting operation illustrated in FIG. 3 is ended. The LDA controller 172 may then restart the pre-boost setting operation illustrated in FIG. 3 after a lapse of a second predetermined period (e.g., several milliseconds to several ten milliseconds). In other words, the pre-boost setting operation illustrated in FIG. 3 may be repeated with a period corresponding to the second predetermined period.

On the other hand, in the determination in the step S202 if it is determined that the departure angle is greater than the predetermined value (the step S202: Yes), the LDA controller 172 arithmetically operates a target hydraulic pressure for the pre-boost (step S203). Here, the "target hydraulic pressure for the pre-boost" may be set to be less than a hydraulic pressure upper limit value for the pre-boost, which does not make the driver feel a behavior change of the vehicle 1, when any of the hydraulic pressures of the wheel cylinders 122FL, 122RL, 122FR, and 122RR is pre-boosted. The hydraulic pressure upper limit value for the pre-boost is typically set to a value that does not allow the braking force to be generated due to the pre-boost of the hydraulic pressure, but may be set to a value that allows the braking force to be generated due to the pre-boost of the hydraulic pressure as long as the driver does not feel the behavior change of the vehicle 1. The "hydraulic pressure upper limit value for the pre-boost" according to the first embodiment is an example of the "predetermined brake fluid pressure" according to embodiments of the present disclosure.

The LDA controller 172 then arithmetically operates a pre-boost trajectory, which is a target trajectory of the hydraulic pressure for realizing the target hydraulic pressure for the pre-boost, i.e., a temporal change of the hydraulic pressure (step S204). A length of a time for pre-boosting the hydraulic pressure, i.e., a pre-boost time, may be set, for example, in such a manner that an operating noise of the brake actuator 13 (e.g., an operating noise of a hydraulic pump) is relatively small, i.e., to a length in which the pre-boost of the hydraulic pressure does not cause the driver to feel uncomfortable.

The LDA controller 172 then arithmetically operates a departure determination correction value, which takes into account the pre-boost of the hydraulic pressure, i.e., a correction value of the departure determination value used for the determination in the step S106 (step S205). The departure determination correction value is expressed, for example, as the product of the lateral velocity of the vehicle 1 and the pre-boost time, i.e., the distance in the lane width direction. This is because the departure determination value is expressed as the distance from the center of the driving lane in the lane width direction, as described above. After the step S205, the LDA controller 172 may then restart the pre-boost setting operation illustrated in FIG. 3 after a lapse of the second predetermined period. Please note that the hydraulic pressure is not pre-boosted only by the pre-boost setting operation.

(Lane Departure Preventing Operation when Pre-Boost Trajectory is Arithmetically Operated)

Next, an explanation will be given to the lane departure preventing operation (refer to FIG. 2) when the pre-boost is arithmetically operated in the pre-boost setting operation illustrated in FIG. 3.

In the step S106 of the lane departure preventing operation illustrated in FIG. 2, the LDA controller 172 may obtain the departure determination correction value, which is arithmetically operated in the step S205 of the pre-boost setting operation illustrated in FIG. 3. The LDA controller 172 may set a new departure determination value from a current departure determination value and the obtained departure determination correction value. The LDA controller 172 may then determine that there is the possibility that the vehicle 1 departs from the driving lane if the departure amount is greater than the new departure determination value.

If the departure amount of the vehicle 1 is defined as the deviation amount of the future position of the vehicle 1 in the lane width direction from the center of the driving lane, the new departure determination value is a value that is on the center side of the driving lane by an amount of the departure determination correction value from the previous departure determination value. Thus, in the determination in the step S106 performed by using the new departure determination value, it may be more easily determined that there is the possibility that the vehicle 1 departs from the driving lane, than in the determination in the step S106 performed when the pre-boost trajectory is not arithmetically operated.

In the determination in the step S106, if it is determined that there is the possibility that the vehicle 1 departs from the driving lane (the step S106: Yes), the LDA controller 172 may transmit, to the brake controller 173, a signal indicating the pre-boost trajectory arithmetically operated in the step S204 of the pre-boost setting operation illustrated in FIG. 3, in parallel with the step S107. The brake controller 173 may control the brake actuator 13 on the basis of the pre-boost trajectory, on condition that the signal indicating the pre-boost trajectory is received.

In parallel with the control of the brake actuator 13 based on the pre-boost trajectory, the steps S108 to S111 of the lane departure preventing operation illustrated in FIG. 2, i.e., the departure avoidance control, may be performed. The temporal change of the hydraulic pressure caused by the departure avoidance control may provide such a trajectory that the hydraulic pressure rises to the hydraulic pressure corresponding to the pressure command value for generating the braking force that allows the target yaw moment to be achieved (i.e., that allows the target yaw rate to be generated), from the target hydraulic pressure for the pre-boost, after a lapse of a predetermined time, as illustrated by a dashed line in FIG. 5 (refer to "hydraulic pressure trajectory of departure avoidance control" in FIG. 5).

(Technical Effect)

The departure angle of the vehicle 1 that is running on the driving lane is relatively small in many cases, as illustrated in FIG. 4A. If the hydraulic pressure is pre-boosted even when the departure angle of the vehicle 1 is relatively small, the hydraulic pressure is pre-boosted in some cases even when the vehicle 1 is not about to depart from the driving lane. Then, the vehicle 1 continues to run in a state in which the hydraulic pressure is pre-boosted. At this time, if the driver of the vehicle 1 operates the brake pedal 111, it is required to reduce the pre-boosted hydraulic pressure.

Here, in many cases, the reduction of the hydraulic pressure is performed through a not-illustrated pressure reducing valve, which is a duty control type solenoid valve having a relatively large operating noise. Thus, the operation of the brake pedal 111 by the driver likely causes the operating noise of the pressure reducing valve, which is not expected by the driver, and likely makes the driver feel uncomfortable.

In the pre-boost setting operation illustrated in FIG. 3, the pre-boost trajectory is arithmetically operated if the departure angle of the vehicle 1 is greater than the predetermined value, as described above. In addition, the pre-boost setting operation provides only the arithmetic operation of the pre-boost trajectory, and until it is determined that "there is the possibility that the vehicle 1 departs from the driving lane" in the step S106 of the lane departure preventing operation illustrated in FIG. 2, the hydraulic pressure is not pre-boosted even if the pre-boost trajectory is arithmetically operated. In other words, on the deflection control apparatus according to the first embodiment (corresponding to the ECU 17 in FIG. 1), it is relatively rare that the pre-boost trajectory is arithmetically operated, and even when the pre-boost trajectory is arithmetically operated, a period in which the hydraulic pressure is actually pre-boosted is relatively short. It is thus possible to relatively reduce an opportunity at which the operating noise of the pressure reducing valve occurs due to the operation of the brake pedal 111 by the driver of the vehicle 1. As a result, it is possible to prevent the driver from feeling uncomfortable.

The "LDA controller 172" according to the first embodiment is an example of the "controller" according to embodiments of the present disclosure.

Modified Example

A modified example of the deflection control apparatus according to the first embodiment will be explained with reference to a flowchart in FIG. 6.

(Pre-Boost Setting Operation)

Figure 6:
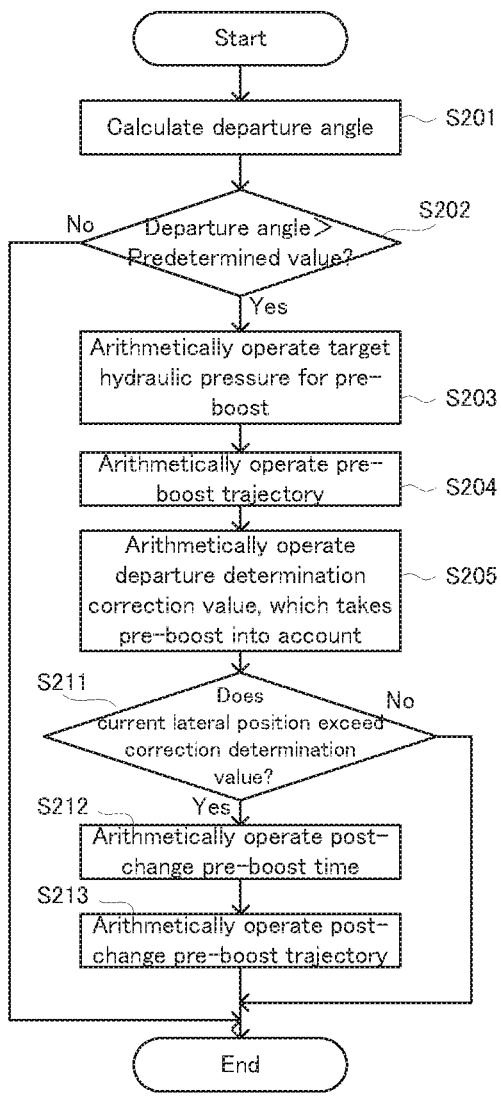
FIG. 6 is a flowchart illustrating a pre-boost setting operation according to a modified example of the first embodiment.

In FIG. 6, after the departure determination correction value is arithmetically operated in the step S205, the LDA controller 172 may compares the new departure determination value, which is set from the current departure determination value and the departure determination correction value, with the current lateral position of the vehicle 1. In other words, the LDA controller 172 determines whether or not the current lateral position of the vehicle 1 exceeds the new departure determination value, i.e., whether or not the vehicle 1 is on an edge side of the lane in comparison with a position in the lane width direction indicated by the new departure determination value (step S211).

In the determination in the step S211, if it is determined that the current lateral position of the vehicle 1 does not exceed the new departure determination value (the step S211: No), the pre-boost setting operation illustrated in FIG. 6 is ended. The LDA controller 172 may restart the pre-boost setting operation illustrated in FIG. 6 after a lapse of the second predetermined period.

On the other hand, in the determination in the step S211, if it is determined that the current lateral position of the vehicle 1 exceeds the new departure determination value (the step S211: Yes), the LDA controller 172 arithmetically operates the pre-boost time (which is herein a "post-change pre-boost time" so that the departure avoidance control is started in predetermined timing (e.g., at a time that is after a lapse of a predetermined time from when it is determined that "there is the possibility that the vehicle 1 departs from the driving lane" in the determination in the step S106 in FIG. 2) (step S212).

The LDA controller 172 then changes the pre-boost trajectory, which is arithmetically operated in the step S204, on the basis of the pre-boost time, which is arithmetically operated in the step S212; namely, a "post-change pre-boost trajectory" is arithmetically operated (step S213). The LDA controller 172 may restart the pre-boost setting operation illustrated in FIG. 6 after a lapse of the second predetermined period. In this case, a hydraulic pressure gradient of the post-change pre-boost trajectory is greater than a hydraulic pressure gradient of a pre-change pre-boost trajectory, i.e., the pre-boost trajectory arithmetically operated in the step S204.

(Technical Effect)

By virtue of such a configuration, it is possible to prevent the departure of the vehicle 1 from the driving lane by using the departure avoidance control, while appropriately pre-boosting the hydraulic pressure.

Second Embodiment

A deflection control apparatus according to a second embodiment of the present disclosure will be explained with reference to FIG. 7 to FIG. 9. The second embodiment is the same as the first embodiment, except the pre-boost setting operation is partially different. Thus, in the second embodiment, the same explanation as that in the first embodiment will be omitted, and the same parts on the drawings will carry the same reference numerals. Basically, a different point will be explained with reference to FIG. 7 to FIG. 9.

(Pre-Boost Setting Operation)

Next, a pre-boost setting operation according to the second embodiment performed in parallel with the aforementioned lane departure preventing operation will be explained with reference to a flowchart in FIG. 7.

Figure 7:
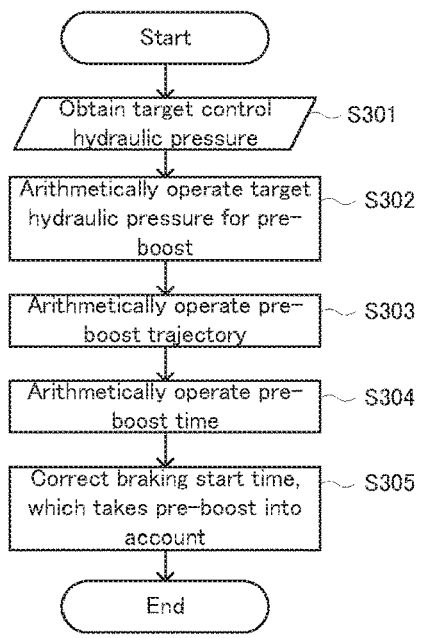
FIG. 7 is a flowchart illustrating a pre-boost setting operation according to a second embodiment.

In FIG. 7, firstly, the brake controller 173 obtains a target control hydraulic pressure, i.e., the hydraulic pressure required to generate the braking force calculated by the LDA controller 172: the hydraulic pressure designated by the pressure command value (step S301). In the second embodiment, the target control hydraulic pressure is expressed, for example, as (i) the hydraulic pressure gradient, or (ii) the target hydraulic pressure after a lapse of a predetermined time. The target control hydraulic pressure is "0" if the step S110 of the lane departure preventing operation illustrated in FIG. 2 is not performed.

The brake controller 173 then arithmetically operates the target hydraulic pressure for the pre-boost, on the basis of a map (refer to FIG. 8) for defining a relation among the obtained target control hydraulic pressure, a target hydraulic pressure gradient of a braking control (which is herein the departure avoidance control), and the target hydraulic pressure for the pre-boost (step S302). As illustrated in FIG. 8, if the target hydraulic pressure gradient is relatively small, the target hydraulic pressure for the pre-boost is "0". In other words, if the target hydraulic pressure gradient is relatively small, the hydraulic pressure is not pre-boosted.

The brake controller 173 then arithmetically operates the pre-boost trajectory on the basis of the target hydraulic pressure for the pre-boost and a boost gradient (or the pre-boost time) for the pre-boost set in advance (step S303). The brake controller 173 then arithmetically operates the pre-boost time on the basis of the pre-boost trajectory (step S304). In the step S303, if the pre-boost trajectory is arithmetically operated on the basis of the target hydraulic pressure for the pre-boost and the pre-boost time, the pre-boost time in the step S303 is obtained in the step S304, instead of the arithmetic operation of the pre-boost time.

The brake controller 173 then corrects a braking start time associated with the departure avoidance control, in view of the pre-boost time (step S305). The brake controller 173 may then restart the pre-boost setting operation illustrated in FIG. 7 after a lapse of a third predetermined period (e.g., several milliseconds to several ten milliseconds). In other words, the pre-boost setting operation illustrated in FIG. 7 may be repeated with a period corresponding to the third predetermined period.

(Lane Departure Preventing Operation)

In the determination in the step S106 of the lane departure preventing operation illustrated in FIG. 2, if it is determined that there is the possibility that the vehicle 1 departs from the driving lane (the step S106: Yes), the LDA controller 172 performs the steps S108 and S109, and transmits the signal indicating the braking force to the brake controller 173.

The brake controller 173 calculates the pressure command value for designating the hydraulic pressure required to generate the braking force, on condition that the signal indicating the braking force is received from the LDA controller 172 (the step S110). As a result, the pre-boost setting operation illustrated in FIG. 7 is performed on the basis of the hydraulic pressure designated by the pressure command value (i.e., the target control hydraulic pressure) and the pre-boost trajectory is arithmetically operated. The braking start time associated with the departure avoidance control is also corrected.

The brake controller 173 may control the brake actuator 13 on the basis of the pre-boost trajectory arithmetically operated. The brake controller 173 controls the brake actuator 13 so as to achieve the hydraulic pressure designated by the pressure command value, from the corrected braking start time (step S111). In other words, after the hydraulic pressure is pre-boosted on the basis of the pre-boost trajectory, the hydraulic pressure is boosted by the departure avoidance control.

(Technical Effect)

Figure 8:
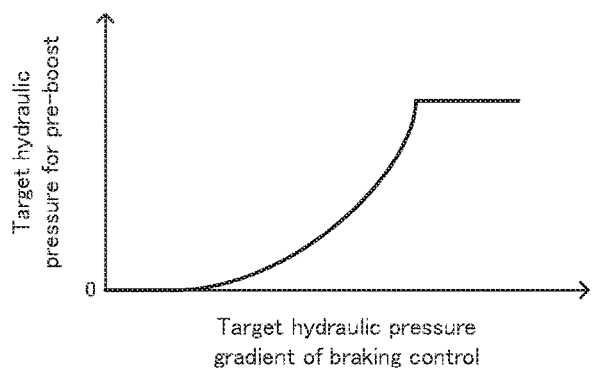
FIG. 8 is a diagram illustrating an example of a map defining a relation between a target hydraulic pressure gradient of a braking control and a target hydraulic pressure for a pre-boost according to the second embodiment.
Figure 9:
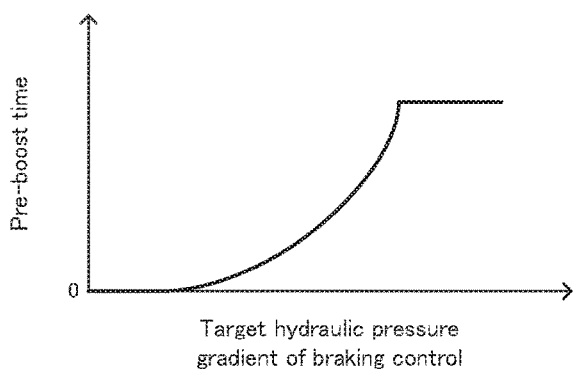
FIG. 9 is a diagram illustrating an example of a relation between the braking control and a pre-booking time according to the second embodiment.

The target control hydraulic pressure (or the target hydraulic pressure gradient of the braking control in FIG. 8) increases in proportion to the departure angle of the vehicle 1. Thus, for example, as illustrated in FIG. 8, if the target hydraulic pressure for the pre-boost is set to "0" when the target hydraulic pressure gradient is relatively small, it is possible to realize an operation in which the hydraulic pressure is pre-boosted only when the departure angle is greater than the predetermined value, without performing the determination in the step S202 of the pre-boost setting operation illustrated in FIG. 3, i.e., the determination of whether or not the departure angle of the vehicle 1 is greater than the predetermined value.

If the boost gradient for the pre-boost is constant regardless of the target hydraulic pressure for the pre-boost, the pre-boost time increases in proportion to the target hydraulic pressure for the pre-boost. Then, the target hydraulic pressure for the pre-boost has, for example, a relation illustrated in FIG. 8, with the target hydraulic pressure gradient of the braking control. Therefore, a relation between the target hydraulic pressure gradient of the braking control and the pre-boost time is, for example, as illustrated in FIG. 9.

As a result, if the departure angle of the vehicle 1 is relatively small, i.e., if the target hydraulic pressure gradient of the braking control is relatively small, the pre-boost time is relatively short, and it is possible to prevent from giving the driver of the vehicle 1 a discomfort caused by the pre-boost. On the other hand, if the departure angle of the vehicle 1 is relatively large, i.e., if the target hydraulic pressure gradient of the braking control is relatively large, it is possible to sufficiently pre-boost the hydraulic pressure. It is thus possible to prevent, for example, a divergence between a target trajectory associated with the braking control (e.g., a yaw rate trajectory, a yaw moment trajectory, a hydraulic pressure trajectory, etc.) and an actual trajectory.

Modified Example

A modified example of the deflection control apparatus according to the second embodiment will be explained with reference to FIG. 10 and FIG. 11. In the modified example, a collision avoidance operation is performed instead of the lane departure preventing operation.

(Configuration of Vehicle)

Firstly, a configuration of a vehicle 2 equipped with the deflection control apparatus according to the modified example will be explained with reference to FIG. 10. FIG. 10 is a block diagram illustrating the configuration of the vehicle 2 according to the modified example of the second embodiment.

In the modified example, the ECU 17, which is a specific example of the "deflection control apparatus", is configured to detect another vehicle and a pedestrian or the like that are on a course of the vehicle 2 and is configured to perform the collision avoidance operation if there is a high possibility of collision. In order to perform the collision avoidance operation, the ECU 17 is provided with a pre-crash safety (PCS) controller 174, as a processing block logically realized therein, or as a processing circuit physically realized therein.

(Collision Avoidance Operation)

The collision avoidance operation according to the modified example will be explained with reference to a flowchart in FIG. 11.

Figure 10:
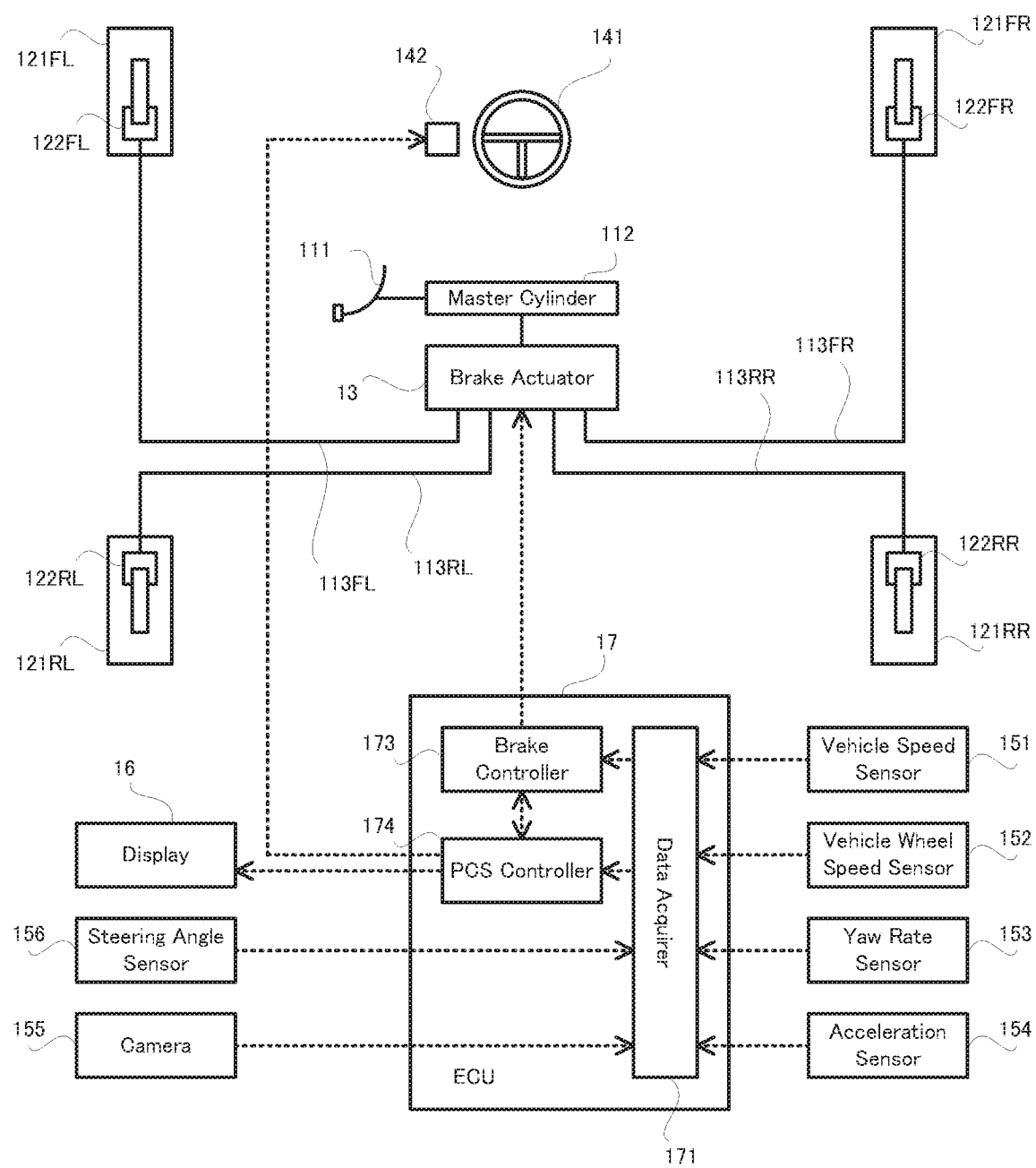
FIG. 10 is a block diagram illustrating a configuration of a vehicle according to a modified example of the second embodiment.

In FIG. 10, firstly, the data acquirer 171 obtains detection data indicating respective detection results of the vehicle speed sensor 151, the vehicle wheel speed sensor 152, the yaw rate sensor 153, and the acceleration sensor 154, and image data indicating images photographed by the camera 155 (step S401).

The PCS controller 174 analyzes the image data obtained in the step S401, thereby recognizing an obstacle that is on the course of the vehicle 2 (step S402). The PCS controller 174 may recognize the obstacle, for example, from a detection result of a not-illustrated millimeter wave radar or the like, in addition to the images photographed by the camera 155. A detailed explanation of a method of recognizing the obstacle will be omitted because the existing technique/technology can be applied to the method.

In parallel with the step S402, the PCS controller 174 analyzes the image data obtained in the step S401, thereby specifying a lane edge of a driving lane on which the vehicle 2 is currently traveling (or a "white line" exemplified in the modified example as an example of the lane edge) in the images photographed by the camera 155. The PCS controller 174 then determines whether or not the driving lane on which the vehicle 2 is currently traveling is a straight lane or a curve, on the basis of the specified white line, and calculates a curvature radius of the driving lane if the driving lane is determined to be the curve (step S403).

The PCS controller 174 arithmetically operates a relative position and a relative speed of the obstacle recognized in the step S402 with respect to the vehicle 2, on the basis of the detection data obtained in the step S401 or the like (step S404).

The PCS controller 174 then determines whether or not there is a possibility that the vehicle 2 collides with the obstacle (step S405). Specifically, for example, the PCS controller 174 may calculate a future position (e.g. in several hundred milliseconds to several seconds) of the vehicle 2, on the basis of a current speed, a current lateral position, current longitudinal acceleration, and current lateral acceleration of the vehicle 2, and the relative position and the relative velocity of the obstacle, or the like. Then, the PCS controller 174 may determine whether or not the future position of the vehicle 2 overlaps a future position of the obstacle. If it is determined that the future position of the vehicle 2 overlaps the future position of the obstacle, the PCS controller 174 determines that there is the possibility that the vehicle 2 collides with the obstacle.

In the determination in the step S405, if it is determined that there is no possibility that the vehicle 2 collides with the obstacle (the step S405: No), the collision avoidance operation illustrated in FIG. 11 is ended. Then, the PCS controller 174 may restart the collision avoidance operation illustrated in FIG. 11 after a lapse of a fourth predetermined period (e.g. several milliseconds to several ten milliseconds). In other words, the collision avoidance operation illustrated in FIG. 11 may be repeated with a period corresponding to the fourth predetermined period.

On the other hand, in the determination in the step S405, if it is determined that there is the possibility that the vehicle 2 collides with the obstacle (the step S405: Yes), the PCS controller 174 alerts a driver of the vehicle 2 to the possibility of the collision of the vehicle 2 with the obstacle (step S406). Specifically, the PCS controller 174 may control the display 16, for example, to display an image for calling the driver's attention, such as, for example, "Brake!", and/or may sound a not-illustrated alarm buzzer.

In parallel with the step S406, the PCS controller 174 performs an emergency avoidance control (step S407). Here, the emergency avoidance control is a control in which a yaw moment in a direction of avoiding the collision is applied to the vehicle 2 so that the collision between the vehicle 2 and the obstacle is avoided.

In the emergency avoidance control in the modified example, the braking force is applied to at least one of the front left wheel 121FL, the rear left wheel 121RL, the front right wheel 121FR, and the rear right wheel 121RR so that there is the braking force difference between the left and right wheels. As a result, the yaw moment in the direction of avoiding the collision is applied to the vehicle 2. The "emergency avoidance control" according to the modified example is another example of the "deflection control" according to embodiments of the present disclosure.

A detailed explanation of the control of avoiding the collision between the vehicle 2 and the obstacle by using the braking force difference between the left and right wheels, i.e., the emergency avoidance control, will be omitted because the existing technique/technology can be applied to the method, but an outline of the method is as follows.

Firstly, a target position that the vehicle 2 should pass may be determined. If the obstacle is still, the target position is a predetermined distance away from a side surface of the obstacle. On the other hand, if the obstacle is moving, the target position may be set to a position a predetermined distance away from an outer edge of a moving range of the obstacle. The predetermined distance may be a distance at which the vehicle 2 can safely pass by the obstacle.

Then, the target yaw rate may be calculated so that the vehicle 2 runs along a target track on which the vehicle 2 passes through the target position (i.e., the vehicle avoids the obstacle), and moreover, the target yaw moment for generating the target yaw rate may be calculated. The braking force that allows the target yaw moment to be achieved may be then calculated, and the pressure command value for specifying the hydraulic pressure required to generate the calculated braking force may be calculated. The brake actuator 13 may be controlled on the basis of the calculated pressure command value, by which the braking force corresponding to the pressure command value may be applied to at least one of the front left wheel 121FL, the rear left wheel 121RL, the front right wheel 121FR, and the rear right wheel 121RR.

(Pre-Boost Setting Operation)

In the modified example, the pre-boost setting operation may be performed in parallel with the aforementioned collision avoidance operation.

In FIG. 7, firstly, the brake controller 173 obtains the target control hydraulic pressure, i.e., the hydraulic pressure required to generate the braking force associated with the emergency avoidance control (the step S301). The target control hydraulic pressure is "0" if the emergency avoidance control is not performed. The brake controller 173 then arithmetically operates the target hydraulic pressure for the pre-boost, on the basis of the map indicating the relation among the obtained target control hydraulic pressure, the target hydraulic pressure gradient of the braking control (which is herein the emergency avoidance control), and the target hydraulic pressure for the pre-boost (the step S302).

The brake controller 173 then arithmetically operates the pre-boost trajectory on the basis of the target hydraulic pressure for the pre-boost and the boost gradient (or the pre-boost time) for the pre-boost set in advance (the step S303). The brake controller 173 then arithmetically operates the pre-boost time on the basis of the pre-boost trajectory (the step S304). The brake controller 173 then corrects the braking start time associated with the emergency avoidance control, in view of the pre-boost time (the step S305).

Figure 11:
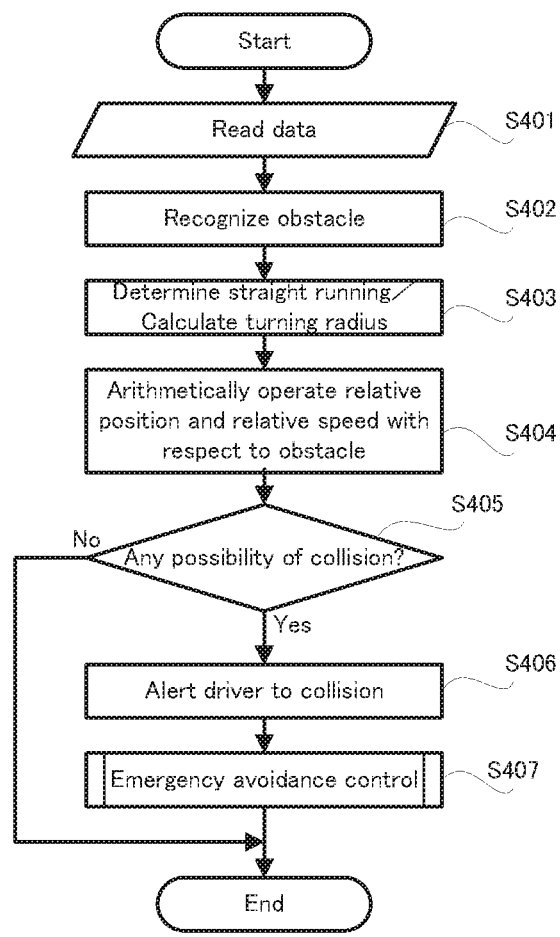
FIG. 11 is a flowchart illustrating a collision avoidance operation according to the modified example of the second embodiment.

As a result of the parallel performance of the pre-boost setting operation and the aforementioned collision avoidance operation, in the step S405 of the collision avoidance control illustrated in FIG. 11, if it is determined that there is the possibility that the vehicle 2 collides with the obstacle (the step S405; Yes), the brake controller 173 calculates the aforementioned pressure command value. As a result, the pre-boost setting operation illustrated in FIG. 7 is performed on the basis of the hydraulic pressure designated by the pressure command value (i.e., the target control hydraulic pressure) and the pre-boost trajectory is arithmetically operated. The braking start time associated with the emergency avoidance control is also corrected.

The brake controller 173 may control the brake actuator 13 on the basis of the pre-boost trajectory arithmetically operated. The brake controller 173 controls the brake actuator 13 so as to achieve the hydraulic pressure designated by the pressure command value, from the corrected braking start time. In other words, after the hydraulic pressure is pre-boosted on the basis of the pre-boost trajectory, the hydraulic pressure is boosted by the emergency avoidance control.

(Technical Effect)

By virtue of such a configuration, it is possible to appropriately pre-boost the hydraulic pressure even in the collision avoidance operation, which does not have a concept of the "departure angle".

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A deflection control apparatus mounted on a vehicle including a plurality of brake mechanisms, which are provided for corresponding wheels and which are configured to apply braking forces to the corresponding wheels by a brake fluid pressure being supplied to the plurality of brake mechanisms, said deflection control apparatus comprising:
a controller programmed to:
determine whether or not the vehicle is about depart from a driving lane on which the vehicle is currently running,
perform a deflection control of supplying the brake fluid pressure to at least one of the plurality of brake mechanisms so that a yaw moment in a direction of avoiding departure of the vehicle from the driving lane is applied to the vehicle, if it is determined that the vehicle is about to depart from the driving lane,
calculate a departure angle, which is an angle made by a longitudinal direction of the vehicle and a direction in which the driving lane extends, and
calculate a boost trajectory for boosting the brake fluid pressure to a target brake fluid pressure for a pre-boost, which is less than the brake fluid pressure supplied to the at least one of the plurality of brake mechanisms in the deflection control, if the calculated departure angle is greater than a predetermined angle;
wherein said controller is programmed to perform the deflection control after pre-boosting the brake fluid pressure associated with the at least one of the plurality of brake mechanism, on the basis of the calculated boost trajectory, if the boost trajectory is calculated and if it is determined that the vehicle is about to depart from the driving lane.

2. The deflection control apparatus according to claim 1, wherein said controller is programmed to
compare a departure amount of the vehicle and a departure determination value,
determine that the vehicle is about to depart from the driving lane if the departure amount of the vehicle is greater than the departure determination value, and
correct the departure determination value to be smaller if the boost trajectory is not calculated as compared to if the boost trajectory is calculated.

* * * * *